Figure 1:
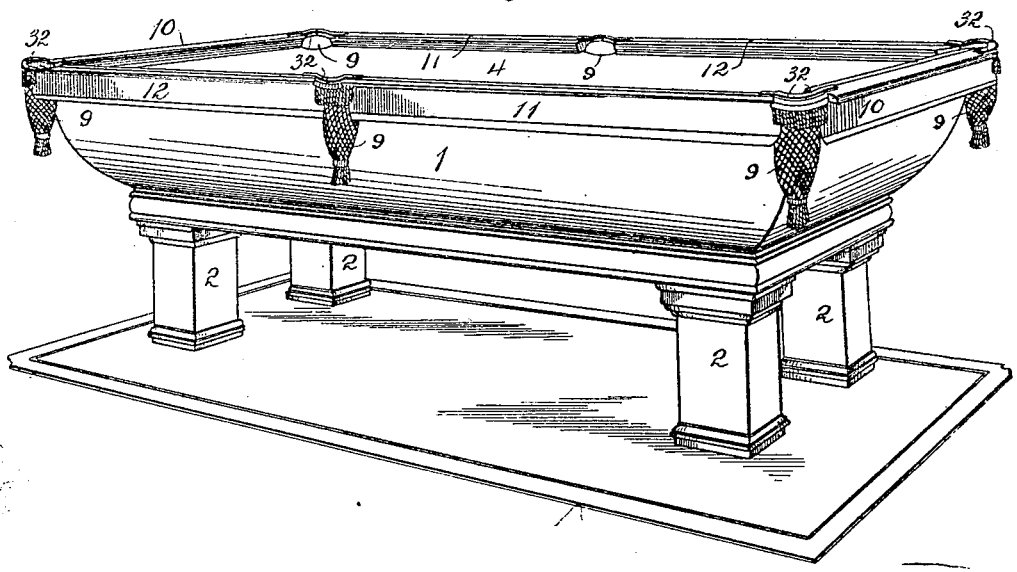

No. 834,694. PATENTED OCT. 30, 1906.
T. R. TREIBER.
CONVERTIBLE POOL AND BILLIARD TABLE.
APPLICATION FILED AUG. 1, 1905.

6 SHEETS—SHEET 1.

Witnesses
R. E. Hamilton
W. C. Singler

Inventor
T. R. Treiber
By Warren D. House,
His Attorney

THE NORRIS PETERS CO., WASHINGTON, D. C.

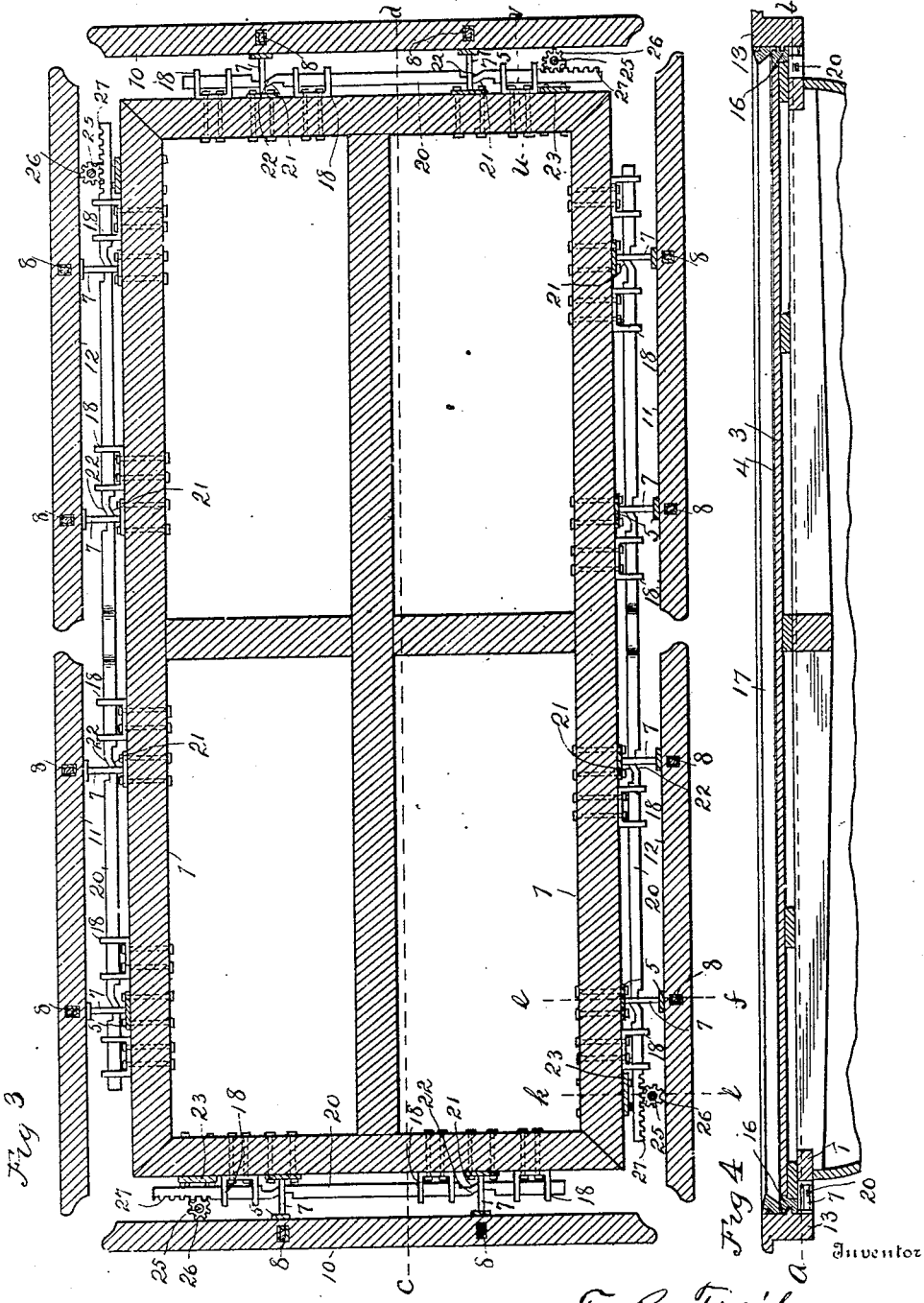

No. 834,694. PATENTED OCT. 30, 1906.
T. R. TREIBER.
CONVERTIBLE POOL AND BILLIARD TABLE.
APPLICATION FILED AUG. 1, 1905.
6 SHEETS—SHEET 3.
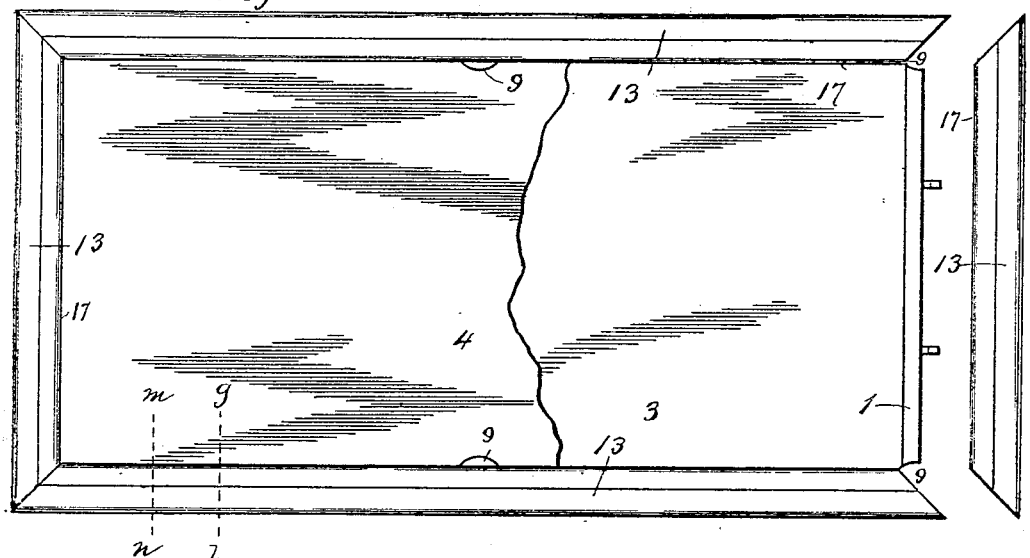
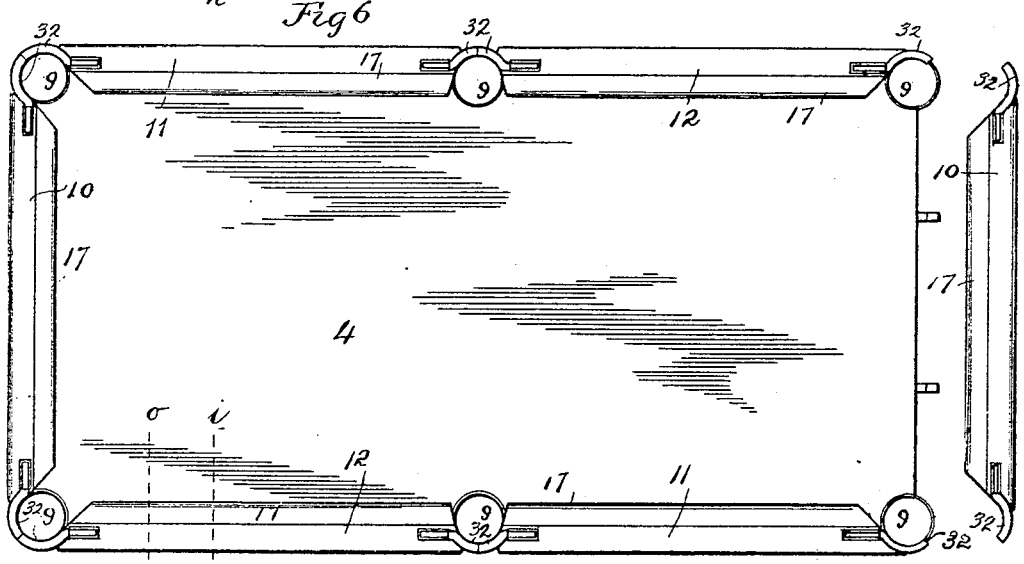
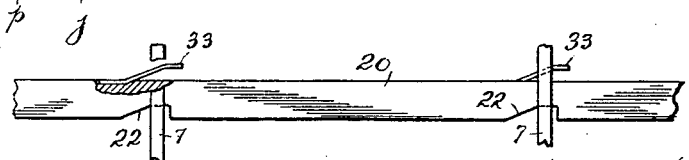

No. 834,694. PATENTED OCT. 30, 1906.
T. R. TREIBER.
CONVERTIBLE POOL AND BILLIARD TABLE.
APPLICATION FILED AUG. 1, 1905.

6 SHEETS—SHEET 4.

Witnesses
R. E. Hamilton
W. C. Single

Inventor
T. R. Treiber
By Warren D. House
His Attorney

No. 834,694. PATENTED OCT. 30, 1906.
T. R. TREIBER.
CONVERTIBLE POOL AND BILLIARD TABLE.
APPLICATION FILED AUG. 1, 1905.
6 SHEETS—SHEET 6.
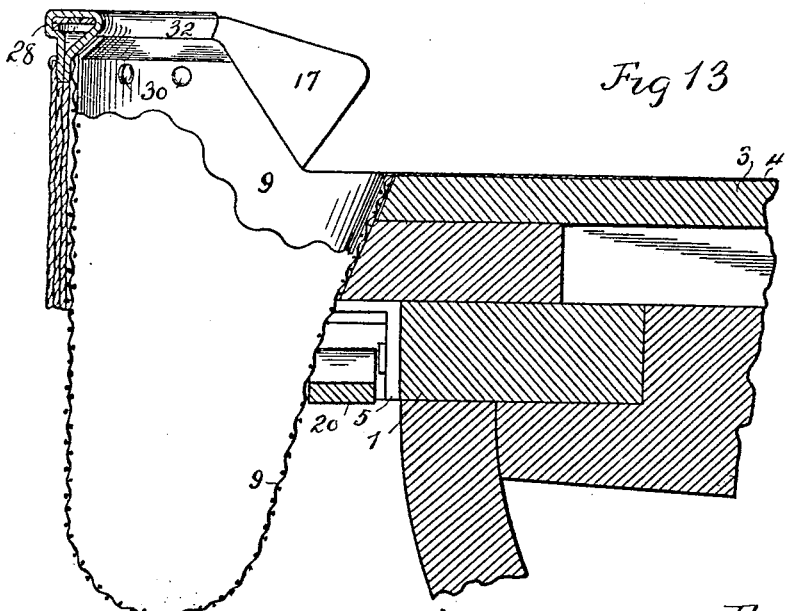
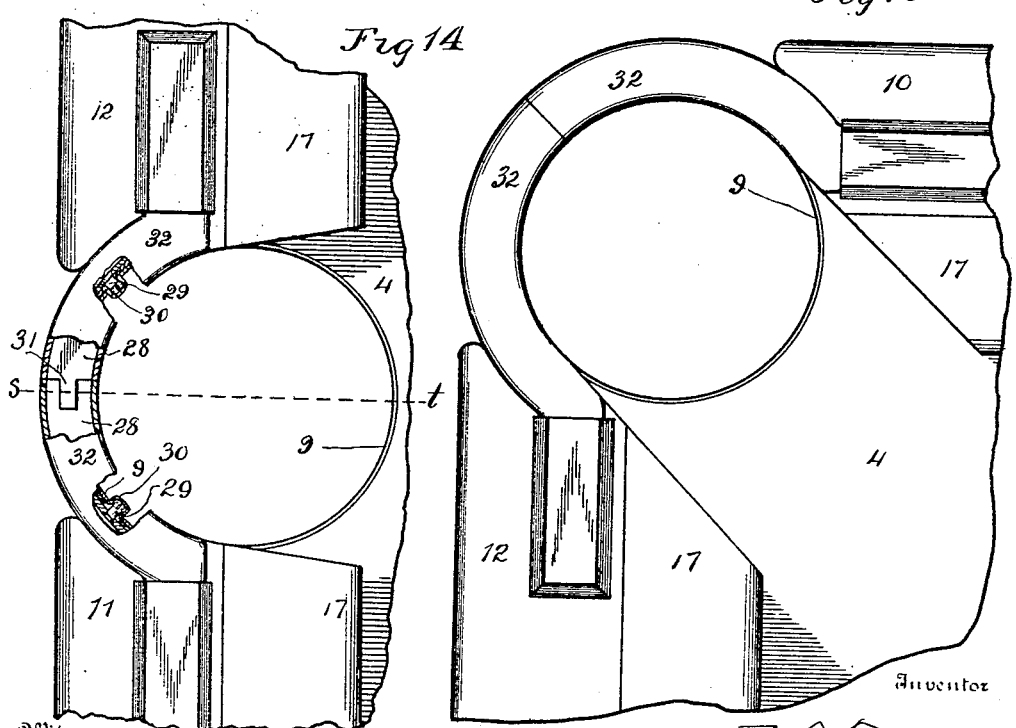

No. 834,694. PATENTED OCT. 30, 1906.
T. R. TREIBER.
CONVERTIBLE POOL AND BILLIARD TABLE.
APPLICATION FILED AUG. 1, 1905.
6 SHEETS—SHEET 6.
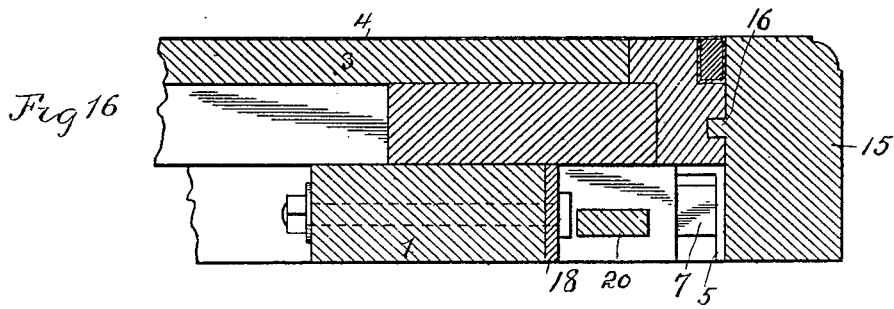
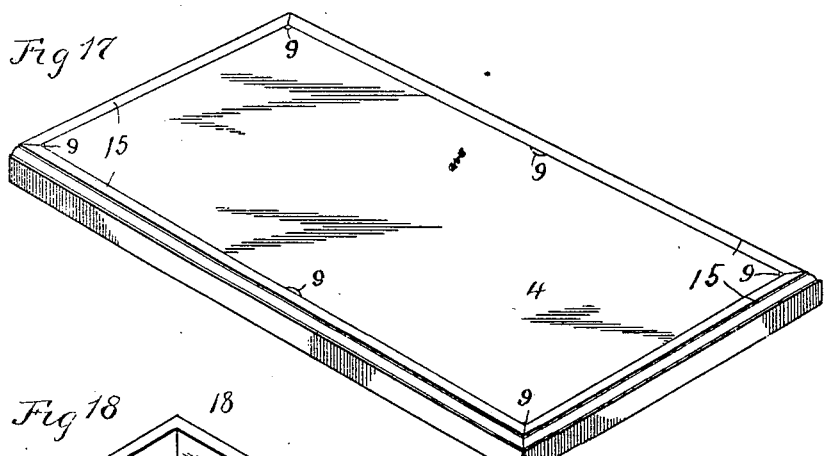
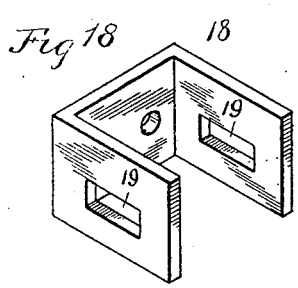
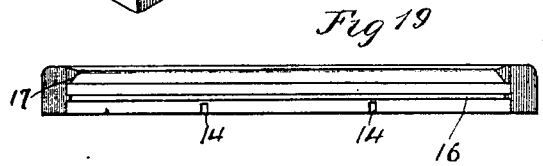
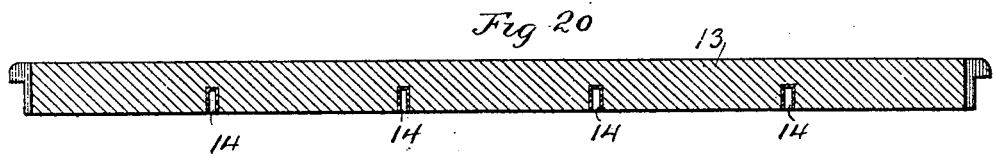
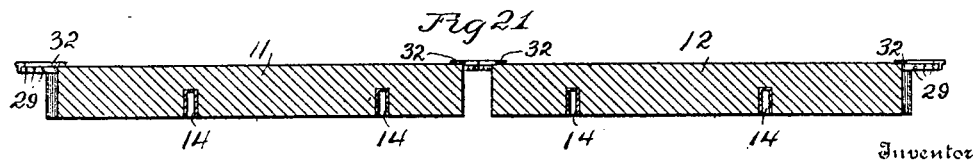
Witnesses
R. E. Hamilton.
W. C. Singler.
Inventor
T. R. Treiber
By Warren D. House
His Attorney

UNITED STATES PATENT OFFICE.

THEODORE R. TREIBER, OF KANSAS CITY, MISSOURI, ASSIGNOR TO THE KANSAS CITY BILLIARD TABLE MANUFACTURING COMPANY, OF KANSAS CITY, MISSOURI, A CORPORATION OF MISSOURI.

CONVERTIBLE POOL AND BILLIARD TABLE.

No. 834,694.     Specification of Letters Patent.     Patented Oct. 30, 1906.

Application filed August 1, 1905. Serial No. 272,219.

*To all whom it may concern:*

Be it known that I, THEODORE R. TREIBER, a citizen of the United States, residing at Kansas City, in the county of Jackson and State of Missouri, have invented new and useful Improvements in Convertible Pool and Billiard Tables, of which the following is a specification.

My invention relates to improvements in convertible pool and billiard tables.

The object of my invention is to provide a table having a construction by which it may be quickly converted into a pool, billiard, or dining table.

The invention provides a bed having marginal pockets, a plurality of interchangeable sets of marginal rails adapted to be mounted one set at a time upon the bed, one set of rails being so formed as to provide when properly mounted on the bed recesses which register, respectively, with the pockets, and suitable rail-supporting means mounted upon the bed and provided with means for supporting and adjusting the rails carried thereby toward and from the bed.

The invention provides, further, the rectangular bed provided with side and corner pockets, a plurality of sets of marginal rails, suitable rail-supports mounted on the bed and upon which at one time one set of rails may be adjusted thereon toward and from the bed, one set of rails having recessed portions on their inner sides to receive the pockets and provided with means for having pockets secured thereto, the other sets of rails when positioned on the bed covering the pockets therein.

Other novel features of construction are hereinafter fully described and claimed.

Figure 2:
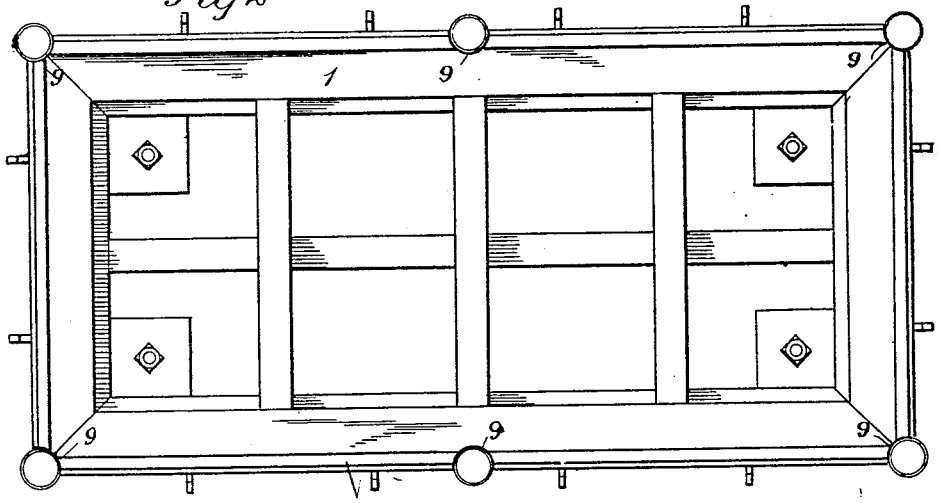
Figure 8:
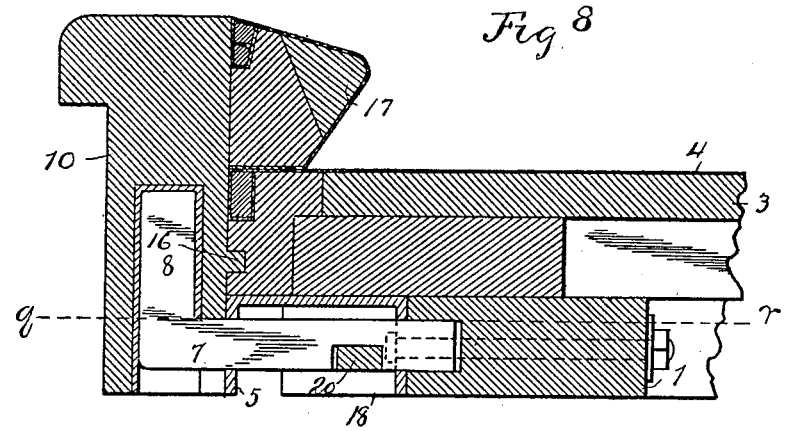
Figure 9:
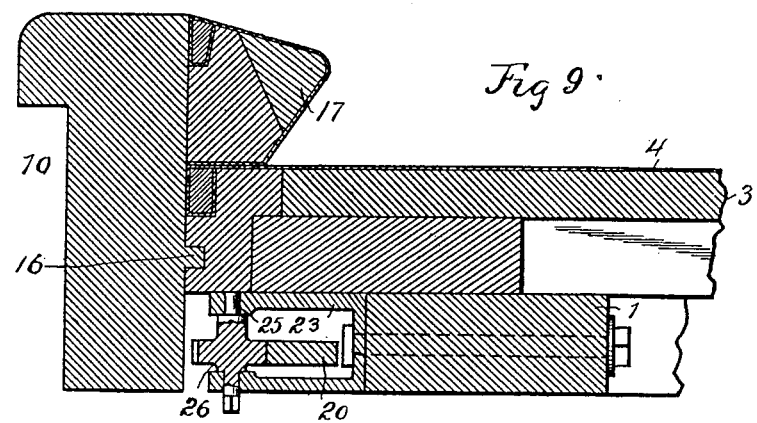
Figure 10:
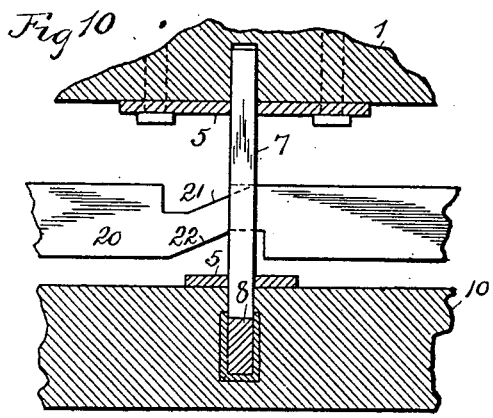
Figure 11:
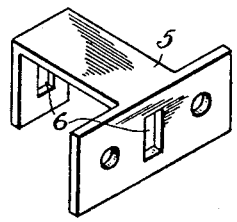
Figure 12:
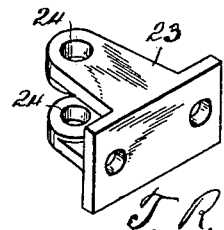

In the accompanying drawings, illustrative of my invention, Figure 1 is a perspective view of the table having mounted thereon marginal rails by which the device is converted into a pool-table. Fig. 2 is a top view of the bed from which the cloth cover and slate slab have been removed. Fig. 3 is a horizontal sectional view taken on the dotted line *a b* of Fig. 4, showing the bed and the pool-rails mounted thereon, the pockets being omitted. Fig. 4 is a vertical section taken on the dotted line *c d* of Fig. 3, the pockets being omitted. Fig. 5 is a top view of the bed having a portion of the slab cover removed and showing three billiard-rails mounted on the bed and one detached therefrom. Fig. 6 is a view similar to Fig. 5, the cover being shown intact and three pool-rails mounted on the bed and one detached therefrom. Fig. 7 is a top view of a portion of one of the cam-bars, showing two resilient cams mounted thereon and portions of two rail-clamping supports. Fig. 8 is a vertical sectional view showing one of the side rails mounted on the bed and taken on any one of the dotted lines *e f*, *g h*, or *i j* of Figs. 3, 5, and 6, respectively, the pool or billiard rails in the planes corresponding to said dotted lines appearing the same in cross-section at these places. Fig. 9 is a cross-section taken on any one of the dotted lines *k l*, *m n*, or *o p* of Figs. 3, 5, and 6, respectively, the pool and billiard rails in the planes corresponding to said dotted lines being similar to each other in cross-section. Fig. 10 is a horizontal sectional view taken on the dotted line *qr* of Fig. 8. Fig. 11 is a perspective view of one of the brackets supporting one of the rail-supports. Fig. 12 is a perspective view of one of the brackets supporting one of the gear-wheels. Fig. 13 is a vertical sectional view taken on the dotted line *s t* of Fig. 14. Fig. 14 is a top view of a portion of the bed and the abutting ends of the two members of a side rail, portions of which are shown in horizontal section. Fig. 15 is a top view of one corner of the bed, having mounted thereon two pool-rails, the abutting ends of which are shown. Fig. 16 is a vertical sectional view of a portion of the table, having one of the rails which convert the table into a dining-table mounted thereon, the view being taken in a plane corresponding to the dotted line *u v* of Fig. 3. Fig. 17 is a perspective view of the bed having the rails mounted thereon which form the dining-table. Fig. 18 is a perspective view of one of the brackets supporting one of the cam-bars. Fig. 19 is an inner side elevation view of one of the end billiard-rails. Fig. 20 is a vertical longitudinal sectional view of one of the side billiard-rails. Fig. 21 is a longitudinal vertical sectional view of one of the side pool-rails.

Similar characters of reference denote similar parts.

The bed is of the ordinary rectangular form, having a horizontal rectangular frame 1 supported by the four legs 2 and having mounted thereon the horizontal slab 3, provided with the cloth cover 4. Upon each of the four margins of the body 1 are secured a plurality of inverted-U-shaped brackets 5, one of which is shown in Fig. 11, the vertical parallel arms of each bracket being provided, respectively, with the transverse slots 6. In the slots 6 of the brackets 5 are respectively mounted the horizontally-slidable rail-supports 7, provided each at its outer end with a vertical projection 8, which engage and support the marginal rails, as hereinafter described.

9 denotes the pockets, secured, respectively, in recesses provided therefor at the corners and side margins of the bed. The said pockets are preferably of the ordinary flexible woven material and are secured at their upper ends and inner sides to the body 1.

10 denotes, respectively, the two end pool-rails, and 11 and 12 denote, respectively, the members forming the side pool-rails.

13 denotes the four detachable billiard-rails, and 15 denotes the four rails which when mounted upon the bed form a dining or library table.

Each of the rails 10, 13, and 15, also the members 11 and 12, is provided with a plurality of vertical sockets 14, adapted to receive projections 8 when the rails are to be mounted upon the bed. All of the rails below a horizontal plane corresponding to the upper side of the cover 4 are substantially similar in construction. Each of the rails is provided on its inner side with a horizontal longitudinal tongue 16, adapted to be fitted in a corresponding groove provided on the adjacent outer edge of the body 1, which tongue serves to retain the rail in position on the bed.

When the members 10, 11, 12, 13, or 15, as the case may be, are mounted upon their supports 7, the said supports may be moved toward the bed in position such that the rails carried thereby will form with the bed the style of table desired. Each of the members 10, 11, 12, and 13 is provided on its inner side with the ordinary longitudinal resilient cushion 17, adapted to receive thereon the impact of the billiard-balls. For inwardly and outwardly sliding the rail-supports 7 the following described mechanism is employed.

Upon the outer edge of each margin of the bed 1 are secured in any desirable manner a plurality of horizontally-disposed U-shaped brackets 18, the parallel arms of which are provided with transverse openings 19. A plurality of horizontal longitudinally-slidable cam-bars 20 are mounted in the openings 19 of adjacent brackets 18. There are four cam-bars 20, disposed one parallel with each margin of the bed. Each cam-bar 20 is provided on its inner edge with a plurality of inclined faces or cams 21, (best shown in Fig. 10,) adapted when the bar 20 is moved lengthwise in the proper direction to engage and force inwardly the members 7, thus forcing toward the bed the rails supported by said member 7. The outer edge of each cam-bar 20 is provided opposite the cams 21 with inclined faces or cams 22, adapted to engage the members 7, said cams being so inclined as to force outwardly the members 7 when the bar 20 is moved in a direction lengthwise opposite that which forces said members inwardly.

The mechanism I prefer to employ for reciprocating the bars 20 comprises the following parts: A plurality of U-shaped brackets 23 are secured one to each outer edge of the body 1 adjacent one end of the body. The parallel arms of each bracket 23 are disposed horizontally one above the other and are provided each with vertical holes 24, as shown in Fig. 12, in which are mounted, respectively, the upper and lower ends of a vertical shaft 25, on which is secured and rotatable therewith a pinion 26, the teeth of which mesh with a series of transversely-disposed rack-teeth 27, provided in the outer edge of the adjacent bar 20. The lower end of each shaft 25 is preferably squared, so as to be gripped by a wrench when it is desired to rotate the pinion carried by the shaft 25, so as to move lengthwise the bar 20, engaged by said pinion. The rails 15 preferably have their upper sides disposed flush with the cover 4 when positioned on the bed, as shown in Fig. 17.

The billiard and pool rails (denoted by 13 and 10, 11, and 12, respectively) extend above the cover 4, the cushions 17, carried by said rails, being located above the said cover. The members 10, 11, and 12 are each recessed at its ends, so as to form, with the adjacent end of the adjacent member, a recess or passage which registers with the adjacent pocket 9, so as to permit the passage of the balls into the pockets 9. Each member 10, 11, and 12 is provided at each end with a curved horizontal projection, preferably of iron and denoted by the numeral 28. Those irons 28 which abut against each other form the outer sides of the recesses which register with the pockets and are provided with inwardly-projecting studs 29, as shown in Fig. 14, adapted to enter sockets 30, provided in the upper end of each pocket 9 upon the outer side thereof. The pocket-irons 28 on the members 12 are each provided with a tongue 31, adapted to enter a groove provided in the adjacent end of the pocket-iron 28, mounted on the adjacent member 11. The tongue-and-groove connection between said pocket-iron properly position the members 11 and 12 relative to each other.

32 denotes a covering of leather which envelops each pocket-iron 28.

In Fig. 7 I have shown one of the bars 20, having mounted on its inner edge a plurality of cam-springs 33, each of which is secured at one end to the bar 20 and is inclined inwardly horizontally relative thereto. The said cams 33 are disposed opposite, respectively, to the outer cams 22. Each of the bars 20, in lieu of the cams 21, may be provided with the cam-springs 33, adapted when the bar is properly moved to engage and force inwardly the adjacent rail-supports 7. By employing spring-cams 33 provision is made for wear between the parts, so that the rails will always be held by resilient pressure firmly against the bed when the bars 20 are properly moved.

As illustrated in Fig. 8, each of the rail-supports 7 on its under side is transversely grooved to receive the bar 20, which actuates it. When it is desired to form a pool-table, the pinions 26 are turned, as hereinbefore described, so as to force the bars 20 in a direction such that the cams 22 will engage and force outwardly the members 7. The members 10, 11, and 12 are then mounted upon the proper projections 8 of the rail-supports, after which the pinions 26 are turned, by means of the shafts 25, so as to move the bars 20 in a direction such that the cams 21 will engage and force inwardly the members 7. The studs 29 are then inserted in the adjacent sockets 30, at which time the rails will be suitably positioned on the bed for forming the pool-table.

If it is desired then to convert the table into a billiard-table, the pockets 9 are released from the studs 29. Then the shafts 25 are turned in a direction such that the pinions 26 will force the bars 20 to positions such that the cams 22 will engage and force outwardly the rail-supports 7, after which the rails 10, 11, and 12 are removed and the rails 13 placed upon the projections 8 of the proper members 7. The pinions are then rotated, as before described, so as to force the rails 13 inwardly against the bed, in which position the pockets 9 will be covered by the rails. The rails 15, which coöperate with the bed to form the dining or library table, are mounted and adjusted in the same manner as described with reference to the rails 13. In order that when the rails 13 and 15 are mounted on the bed they may form miter-joints at the corners, the ends of said rails are beveled so as to converge inwardly at an angle of forty-five degrees.

My invention may be variously modified without departing from its spirit.

Having thus described my invention, what I claim, and desire to secure by Letters Patent, is—

1. In a convertible pool and billiard table, the combination with the bed having marginal pockets, of marginal rails having cushions on their inner sides and when secured to the margins of the bed forming recesses registering with said pockets, and means by which the rails are independently adjusted toward and from the edges of the bed.

2. In a convertible pool and billiard table, the combination with the bed having marginal pockets, of a plurality of marginal rails having cushions on their inner sides and when properly positioned against the margins of the bed forming recesses registering with said pockets, rail-supporting means provided on the bed, and means for so moving said supporting means as to independently adjust said rails toward and from the margins of the bed.

3. In a convertible pool and billiard table, the combination with the bed having marginal pockets, of rail-supports slidably mounted on the bed, a plurality of marginal rails detachably mounted on said supports and having cushions on their inner sides, said rails when positioned against the bed forming recesses registering with said pockets, and means by which when the said supports are slid the rails will be independently adjusted relative to the margins of the bed.

4. In a convertible pool and billiard table, the combination with the bed having marginal pockets suspended therefrom, of a set of marginal rails having cushions on their inner sides and when positioned against the margins of the bed forming recesses registering with said pockets, the rails being provided with means for supporting the pockets, and means for independently adjusting the rails toward and from the margins of the bed.

5. In a convertible pool and billiard table, the combination with the bed having marginal pockets, of rail-supports mounted on the bed, a plurality of detachable rails mounted on said supports and having cushions on their inner sides and when positioned against the margins of the bed forming recesses registering with said pockets, said rails carrying respectively devices which form pocket-irons inclosing the outer sides of said recesses respectively, and means connected with said supports by which said rails are independently adjusted toward and from the bed.

6. In a convertible pool and billiard table, the combination with the bed having marginal pockets, of rail-supports mounted on the bed, a plurality of detachable marginal rails having cushions on their inner sides and mounted on said supports, the rails when positioned against the bed forming recesses registering with said pockets, each rail at its ends having devices coöperating with similar devices on the adjacent ends of adjacent rails to form pocket-irons embracing the outer sides of said recesses, and means by which when the rail-supports are moved the rails will be independently adjusted toward and from the margins of the bed.

7. In a convertible pool and billiard table, the combination with the bed having marginal pockets, of rail-supports mounted upon the bed and slidable toward and from the respective margins thereof, a plurality of movable bars mounted on the bed and provided with means for engaging and sliding said rail-supports respectively toward and from the bed, means for moving said bars, and a plurality of detachable marginal rails carried by said supports and having cushions on their inner sides and when positioned against the bed forming recesses registering with said pockets respectively.

8. In a convertible pool and billiard table, the combination with the bed having marginal pockets, of rail-supports mounted upon and slidable toward and from the bed opposite the respective margins thereof, a plurality of slidable bars mounted upon the bed and engaging respectively said supports so as to slide the same when the bars are slid, means for sliding said bars, and a plurality of detachable marginal rails carried by said supports and movable against and from the margins respectively of the bed, the rails when positioned against the bed forming recesses registering with said pockets respectively.

9. In a convertible pool and billiard table, the combination with the bed having marginal pockets, of a plurality of bars slidably mounted upon the bed, means for sliding said bars, a plurality of detachable rails movable against and from the respective margins of the bed and, when positioned against the bed, forming recesses registering respectively with said pockets, and supporting means carrying said marginal rails and movable upon the bed when said bars are moved so as to force the rails against or from the bed.

10. In a convertible pool and billiard table, the combination with a bed having marginal pockets, of rail-supports mounted on the bed, and movable toward and from the margins respectively of the bed, a plurality of bars slidably mounted on the bed and provided with means for engaging and moving said supports respectively when the bars are properly moved, the bars being provided each with a series of teeth, a plurality of gear-wheels rotatively mounted on the bed and engaging respectively said toothed bars, the gear-wheels being provided with means by which they may be rotated, and a plurality of detachable marginal rails mounted respectively upon said rail-supports and movable therewith against and from the bed and, when positioned against the bed forming recesses registering respectively with said pockets.

11. In a convertible pool and billiard table, the combination with the bed having at one edge side and corner pockets, of two marginal rails independently movable toward and from the said edge of the bed and provided each with recessed portions which when the rails are properly positioned, register respectively with said pockets, and means mounted on the bed by which said rails may be independently adjusted toward and from the bed.

12. In a convertible pool and billiard table, the combination with the rectangular bed having pockets at its four corners and two side margins, of the end and side detachable marginal rails independently adjustable respectively toward and from the bed, the side rails having recessed portions registering with the side pockets respectively, and end and side rails having at their ends recessed portions which, when the rails are positioned against the bed, register with the corner pockets, and means mounted on the bed by which the side and end rails may be independently adjusted toward and from the bed.

13. In a convertible pool and billiard table, the combination with the rectangular bed having pockets at its four corners and two side margins, of the two end rails and two side rails independently adjustable toward and from the adjacent margins of the bed respectively, the side rails comprising each two members disposed end to end said members having recessed portions adapted to register with the side pockets respectively, the end rails and side rails where they abut against each other having recessed portions adapted to register with the corner-pockets, and means mounted on the bed for supporting and independently adjusting the rails toward and from the adjacent margins respectively of the bed.

14. In a convertible pool and billiard table, the combination with the bed having the marginal pockets, of a set of marginal rails adapted to be supported by the bed and movable respectively toward and from the respective margins thereof, the rails having recessed portions adapted to register with the said pockets adjacent thereto, and resilient means for forcing the rails against the bed.

15. In a convertible pool and billiard table, the combination with the bed having pocket-recesses, of the pockets secured to the bed in said recesses respectively, a plurality of marginal rails independently movable toward and from the adjacent margins respectively of the bed and provided with recesses respectively which are adapted to register with the adjacent pocket-recesses respectively and provided with means for securing thereto the adjacent pockets, and means for independently adjusting the rails toward and from the bed.

16. In a convertible pool and billiard table, the combination with the bed having the marginal pockets, of a plurality of rail-supports movable toward and from the respective margins of the bed, a plurality of longitudinally-slidable bars mounted on the bed and adapted to engage and move the adjacent rail-supports toward and from the bed when the said bars are reciprocated, said bars each being provided with a series of transverse teeth, a plurality of gear-wheels rotatively mounted on the bed and meshing respectively with said toothed bars, and two sets of marginal rails adapted to be mounted one set at a time upon said rail-supports respectively and movable with said supports toward and from the bed, one set of rails having recessed portions adapted to register with the pockets adjacent thereto in the bed when the rails are properly positioned.

In testimony whereof I affix my signature in presence of two subscribing witnesses.

THEODORE R. TREIBER.

Witnesses:
WARREN D. HOUSE,
HENRY F. ROSE.